(12) United States Patent
Haney

(10) Patent No.: US 10,307,931 B2
(45) Date of Patent: Jun. 4, 2019

(54) OIL DELIVERY SYSTEM FOR THE LUBRICATION OF A CHAINSAW

(71) Applicant: The Research Foundation for SUNY, Albany, NY (US)

(72) Inventor: Neil Haney, Chase Mills, NY (US)

(73) Assignee: The Research Foundation for SUNY, Albany, NY (US)

(*) Notice: Subject to any disclaimer, the term of this patent is extended or adjusted under 35 U.S.C. 154(b) by 150 days.

(21) Appl. No.: 15/219,225

(22) Filed: Jul. 25, 2016

(65) Prior Publication Data

US 2017/0021523 A1     Jan. 26, 2017

Related U.S. Application Data

(60) Provisional application No. 62/196,682, filed on Jul. 24, 2015.

(51) Int. Cl.
| | |
|---|---|
| *B27B 17/12* | (2006.01) |
| *F04C 15/00* | (2006.01) |
| *F04C 2/10* | (2006.01) |
| *F16N 7/38* | (2006.01) |
| *F04C 14/24* | (2006.01) |
| *F16N 13/20* | (2006.01) |
| *F01M 1/02* | (2006.01) |

(52) U.S. Cl.
CPC ............. *B27B 17/12* (2013.01); *F04C 2/102* (2013.01); *F04C 14/24* (2013.01); *F16N 7/385* (2013.01); *F01M 2001/0238* (2013.01); *F04C 15/0007* (2013.01); *F04C 2210/14* (2013.01); *F16N 13/20* (2013.01); *F16N 2210/33* (2013.01)

(58) Field of Classification Search
CPC . B27B 17/12; F01M 2001/0238; F04C 14/24; F04C 15/0007; F04C 2210/14; F04C 2/102; F16N 13/20; F16N 2210/33; F16N 7/385

See application file for complete search history.

(56) References Cited

U.S. PATENT DOCUMENTS

| | | | | |
|---|---|---|---|---|
| 4,353,163 | A * | 10/1982 | Overbury | B27B 17/12 137/543.13 |
| 4,648,486 | A * | 3/1987 | Kayser | B65G 45/08 184/15.1 |
| 5,421,702 | A * | 6/1995 | Revak | F01D 25/20 184/6.28 |
| 7,637,725 | B2 | 12/2009 | Berger | |
| 8,011,342 | B2 | 9/2011 | Bluhm | |
| 9,074,670 | B1 * | 7/2015 | Bonny | F16H 39/14 |
| 2011/0259294 | A1 | 10/2011 | Herzer et al. | |
| 2012/0251371 | A1 | 10/2012 | Nirasawa et al. | |
| 2013/0068328 | A1 | 3/2013 | Kardile et al. | |
| 2014/0341769 | A1 * | 11/2014 | Sasaki | F04C 2/10 418/61.2 |
| 2015/0298344 | A1 * | 10/2015 | Hallendorff | B27B 17/12 30/123.4 |
| 2015/0323059 | A1 | 11/2015 | Pritchard | |
| 2017/0113315 | A1 * | 4/2017 | Bangma | B23Q 11/1046 |

\* cited by examiner

*Primary Examiner* — Stephen Choi
(74) *Attorney, Agent, or Firm* — Steven A. Wood

(57) ABSTRACT

The disclosure provides a method of oil delivery to a chainsaw chain blade using a gerotor pump in sequence with flow control valves to provide lubrication to the chain blade to reduce friction with the chainsaw bar guide and prevent overheating and damage to the chain blade or guide bar.

14 Claims, 15 Drawing Sheets

PRIOR ART

OIL DELIVERY SYSTEM FOR THE LUBRICATION OF A CHAINSAW

CROSS-REFERENCE TO RELATED APPLICATION

This application claims the benefit of U.S. Provisional Application No. 62/196,682, filed Jul. 24, 2015 and entitled OIL DELIVERY SYSTEM FOR THE LUBRICATION OF A CHAINSAW, the entire contents of which are incorporated herein by reference.

BACKGROUND

1. Field

The present disclosure relates to an oil delivery system for lubrication, and, more particularly, to an oil delivery system for the lubrication of chainsaw chain blade around a guide bar.

2. Description of Related Art

Chainsaws are commonly used to fell trees and harvest timber, both on an industrial scale and in private use. Chainsaws generally include a motor, typically either electric or gasoline powered, that drives a metal chain blade, comprising interlinked articulated saw teeth, around a guide bar at a high speed such that saw teeth along the chain may cut through timber or other materials. Chainsaws are used in handheld form and are also mounted onto machines as part of a larger timber processing systems, such as firewood processors, tree harvesters, or feller grapple heads.

The surface between the chain blade and guide bar requires adequate lubrication to reduce the amount of heat generated by friction, and prevent deterioration of the chain blade and guide bar. To lubricate this surface, lubricating fluid is typically pulled from a reservoir through fluid conduits by a pump and delivered to the guide bar, where the fluid lubricates the interface between chain blade and guide bar.

Currently, two different types of pumps are used to provide oil and lubrication to the interface between a chainsaw chain blade and guide bar. One type of pump, a syringe pump, is comprised of a piston that forces oil through a chamber and fluid lines to the guide bar. Another type of pump, a gasoline fuel injection pump, comprises a cylinder that rotates inside of a chamber of oil, thereby flows oil to the guide bar. As depicted in FIG. 1, a chainsaw lubrication system generally comprises an oil reservoir, a pump, and fluid flow lines to provide lubricating oil to the interface between the chainsaw chain blade and guide bar channel.

The conventional syringe and fuel injection style pumps require frequent maintenance and fail to consistently deliver the optimal flow of oil to the guide bar necessary for maximum chain cutting efficiency. Therefore, there is a need in the industry for an improved oil pump mechanism for delivery of lubrication.

SUMMARY

The following is a summary of the invention in order to provide a basic understanding of some aspects of the invention. This summary is not intended to identify all key or critical elements of the invention or to delineate the entire scope of the invention. Its sole purpose is to present some concepts of the invention in a simplified form as a prelude to the more detailed description that is presented later.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

The present invention comprises a positive displacement gerotor pump, oil reservoir, gate valve, pressure relief valve, chainsaw guide bar, and fluid tubing feed lines that together deliver oil at a consistent rate to the chainsaw chain blade and guide bar. The gerotor pump is mounted in a housing and powered by a motor. The housing incorporates input and output ports to which fluid feed lines may be attached, as well as an inner and outer gerotor gears.

The motor spins the gerotor gears to create suction that pulls oil from an oil reservoir through the fluid feed tubing lines. A gate valve (GV) is connected to the output of the gerotor pump, and a pressure relief valve (PRV) is also connected to output of the gerotor pump.

The GV downregulates the oil flow and the PRV outlet returns surplus oil back to the oil reservoir if the oil pressure exceeds a set threshold in the fluid lines upstream of the GV. The outlet line from the GV is connected to an oil inlet port on the chainsaw guide bar and the oil passes through an oil feed line to the guide bar channel and is picked up by the underside of the chain blade as it rotates along the guide bar.

On larger systems such as firewood processors or tree harvesters, some components of the oil lubrication system may be located outside of the chainsaw motor housing, and system components employed to deliver oil to the chain blade and guide bar may be mounted throughout the machinery.

During use the motor powering the gerotor pump is activated, simultaneously when an operator starts the firewood processor, chainsaw or other machine, and spins the gerotor gears to pull oil through the fluid flow lines. Oil is pumped through the fluid lines continuously while the machine is in operation. Upon shutting off the machine, the motor stops powering the pump, ceasing the flow of oil.

BRIEF DESCRIPTION OF THE DRAWINGS

Non-limiting and non-exhaustive features will be described with reference to the following figures, wherein like reference numerals refer to like parts throughout the various figures. The figures below were not intended to be drawn to any precise scale with respect to size, angular relationship, or relative position.

DETAILED DESCRIPTION

Figure 1:
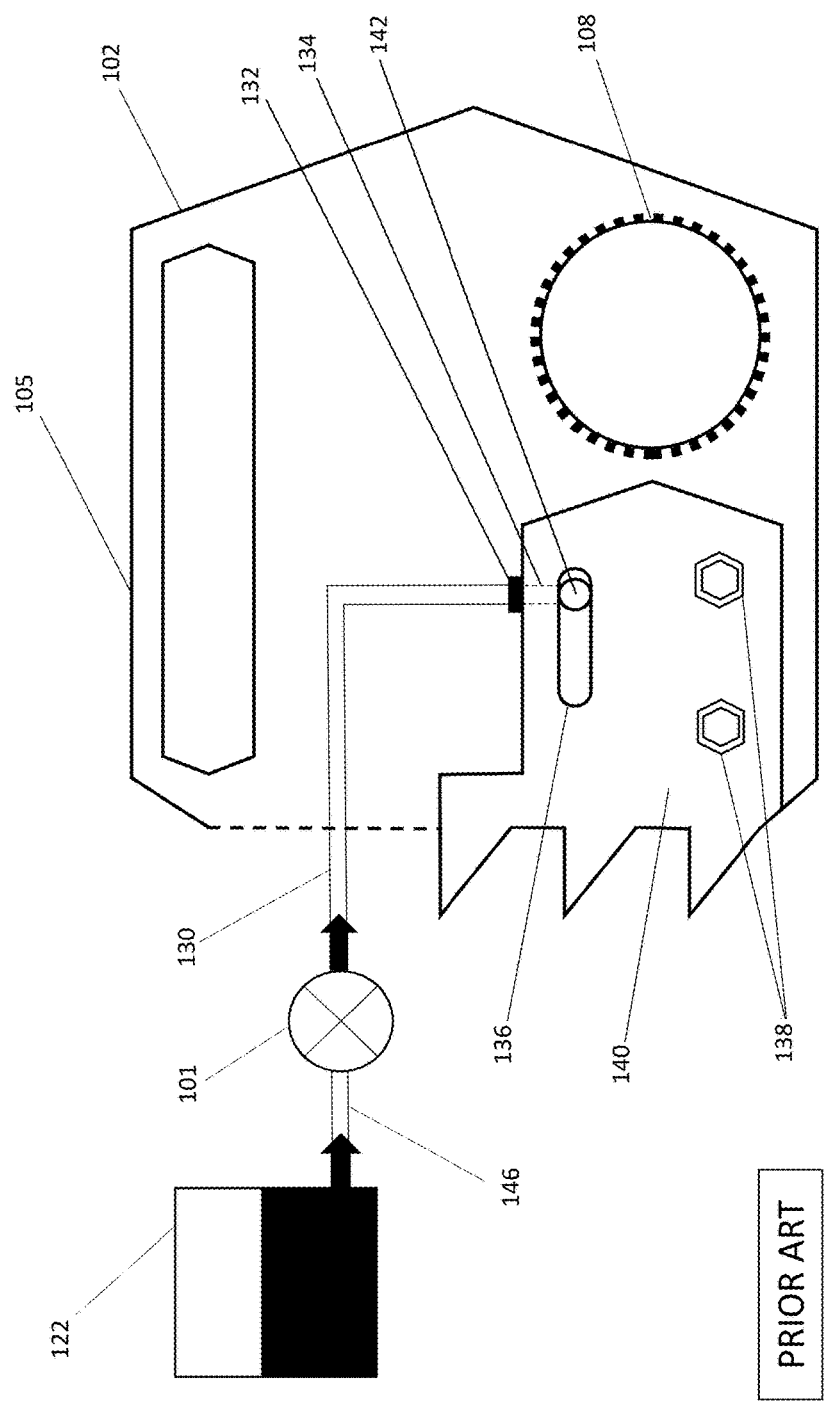
FIG. 1 depicts the general structure and major components of oil lubrication systems currently used on chainsaws.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof and the invention includes all such modifications, such as, but not limited to, the use of this lubrication system technology on masonry chainsaws and systems, or for the lubrication of circular saw blades.

Chainsaws are commonly used in the forestry industry to gather timber for production into finished goods such as lumber, firewood, or woodchips. Chainsaws are also commonly sold for private use for smaller-scale tree felling. They may be hand-held for direct use by an individual operator, or may be incorporated into harvesting systems where the chainsaw is used to cut timber for a larger-scale tree felling or log-splitting operation. Specialized chainsaws are also used in the masonry industry to cut through stone.

The present invention is an improvement to lubrication systems currently employed in, but not limited to, chainsaws as well as larger raw material harvesting systems such as tree harvesters and firewood processors. Unlike existing lubrication systems, the present invention uses a gerotor pump to pull oil from an oil reservoir and drive oil through the system. The gerotor pump is a simple and elegant positive displacement pump design that requires little to no maintenance—in contrast to conventional chainsaw and bar saw oil pumps.

In the present invention, a lubricating fluid, e.g. oil, is held in a reservoir and is pulled from the reservoir through fluid feed line tubing into a gerotor pump through suction created by operation of the pump. Further, once inside the gerotor pump the fluid is compressed and pushed through fluid feed line tubing to the gate valve (GV), which downregulates the fluid flow and may cause an increase in pressure in the fluid lines between the gerotor pump and the GV.

A pressure relief valve (PRV) is also connected to the fluid lines downstream of the gerotor pump, wherein the PRV allows surplus fluid to flow back into the reservoir to decrease the amount of fluid in the feed lines and keep the pressure in the fluid lines between the gerotor pump and GV below some set threshold. Beyond the GV, the fluid flows through additional system fluid lines, components and delivery mechanisms to the point of application.

In one embodiment for application to a chainsaw, the fluid, e.g. oil, flows from the GV to a guide bar mount inlet port, through the guide bar mount oil conduit, out of the guide bar mount oil delivery port and into the guide bar mount oil feed channel. The guide bar is secured to the guide bar mount and the guide bar oil inlet port is aligned with the guide bar mount oil feed channel, to feed oil from the oil feed channel into the guide bar oil conduit, out of the guide bar channel oil delivery port and into to the guide bar channel, applying lubrication to the channel, rails and also to the underside of the chainsaw chain blade.

FIG. 1 depicts the general structure and major components of an oil lubrication system for a chainsaw, known in the art, which comprises an oil reservoir 122, a pump 101, and fluid delivery lines 146 and 130. Oil travels from the reservoir 122 through the delivery line 146, into the pump 101, through delivery line 130 and into guide bar mount oil delivery port 142 of the guide bar mount 140 (see FIG. 5). From the guide bar mount delivery port 142, the oil travels through the oil feed channel 136 and into the guide bar oil inlet port 120 in order to lubricate the interface between the chainsaw chain blade and the guide bar (respectively 104 & 106 in FIG. 2). In practice, when the guide bar 106 is secured to the guide bar mount 140 inside the motor housing 102 via the guide bar mounting bolts 138 and the guide bar mounting holes (112 in FIGS. 3 & 4), the oil feed channel 136 is sealed against the surface of the guide bar 102 surrounding the guide bar oil inlet port 120. The motor housing 102 may also include a handle 105 for easy carrying and use of the machine.

Figure 2:
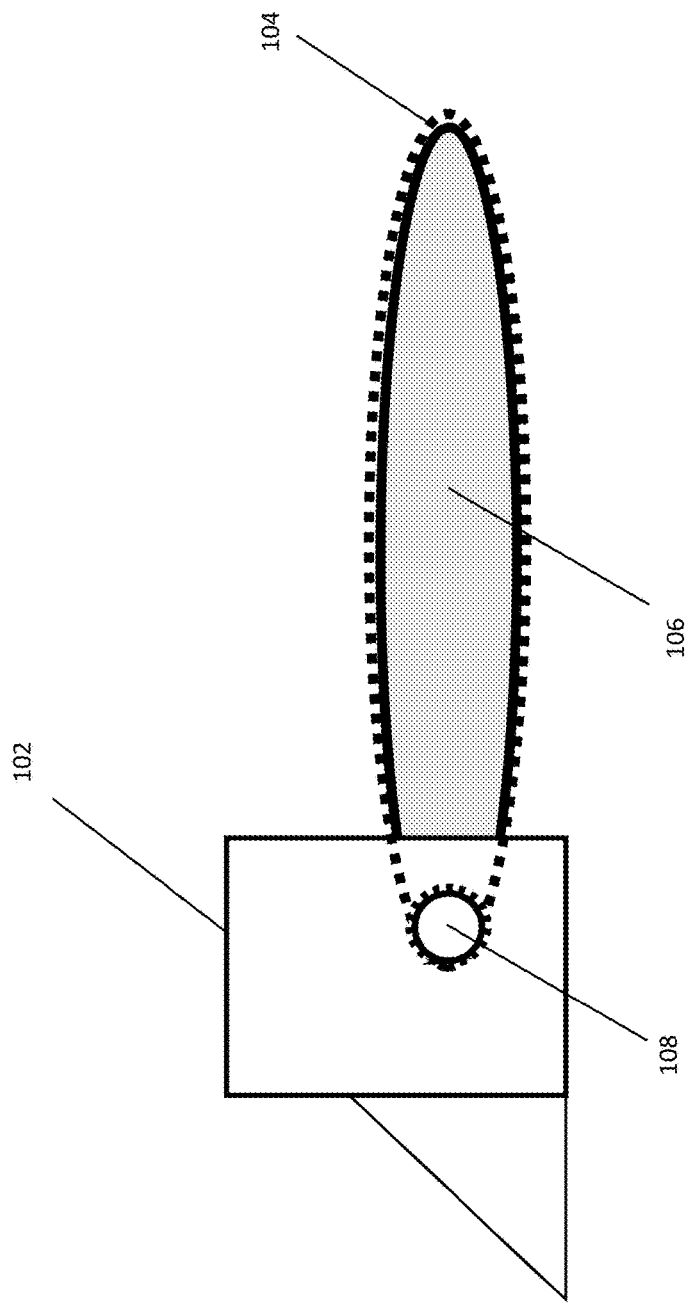
FIG. 2 depicts the general structure and major components of a chainsaw.

FIG. 2 depicts the general structure of a chainsaw, known in the art, which comprises the motor housing 102, the chainsaw chain blade 104 and guide bar 106. The motor housing contains a chainsaw motor drive 108 (also seen in FIG. 1), which is employed to drive the chain blade around the guide bar, and a guide bar mount plate (140 in FIGS. 1 & 5) to which the guide bar 106 is affixed. The motor drive 108 may be powered by an electric, gasoline or hydraulic motor, without limitation. The motor housing 102 also usually contains a lubrication system designed to provide oil to the interface between the chainsaw chain blade 104 and guide bar 106.

Figure 3:
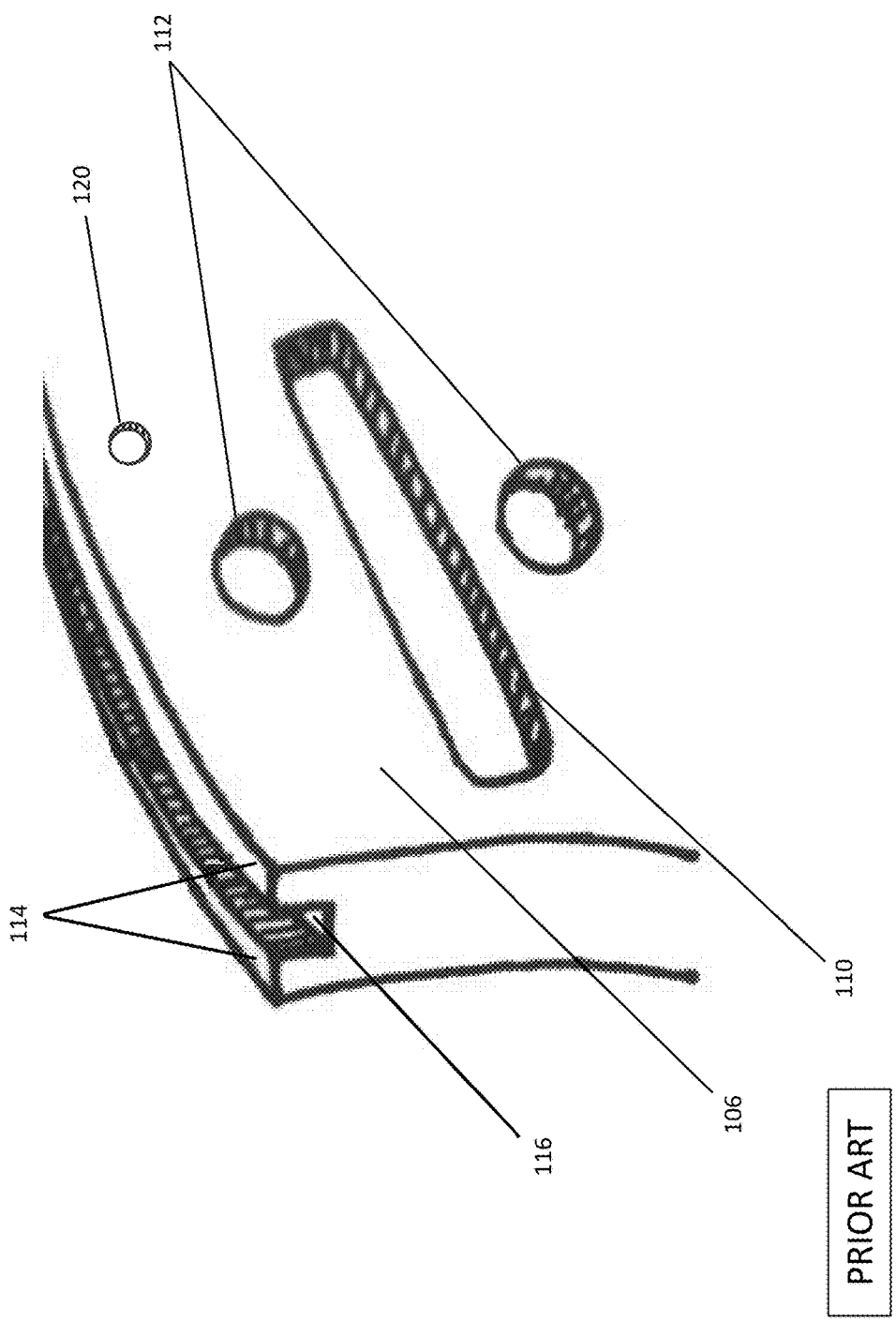
FIG. 3 depicts the channel and rails of a chainsaw guide bar.
Figure 5:
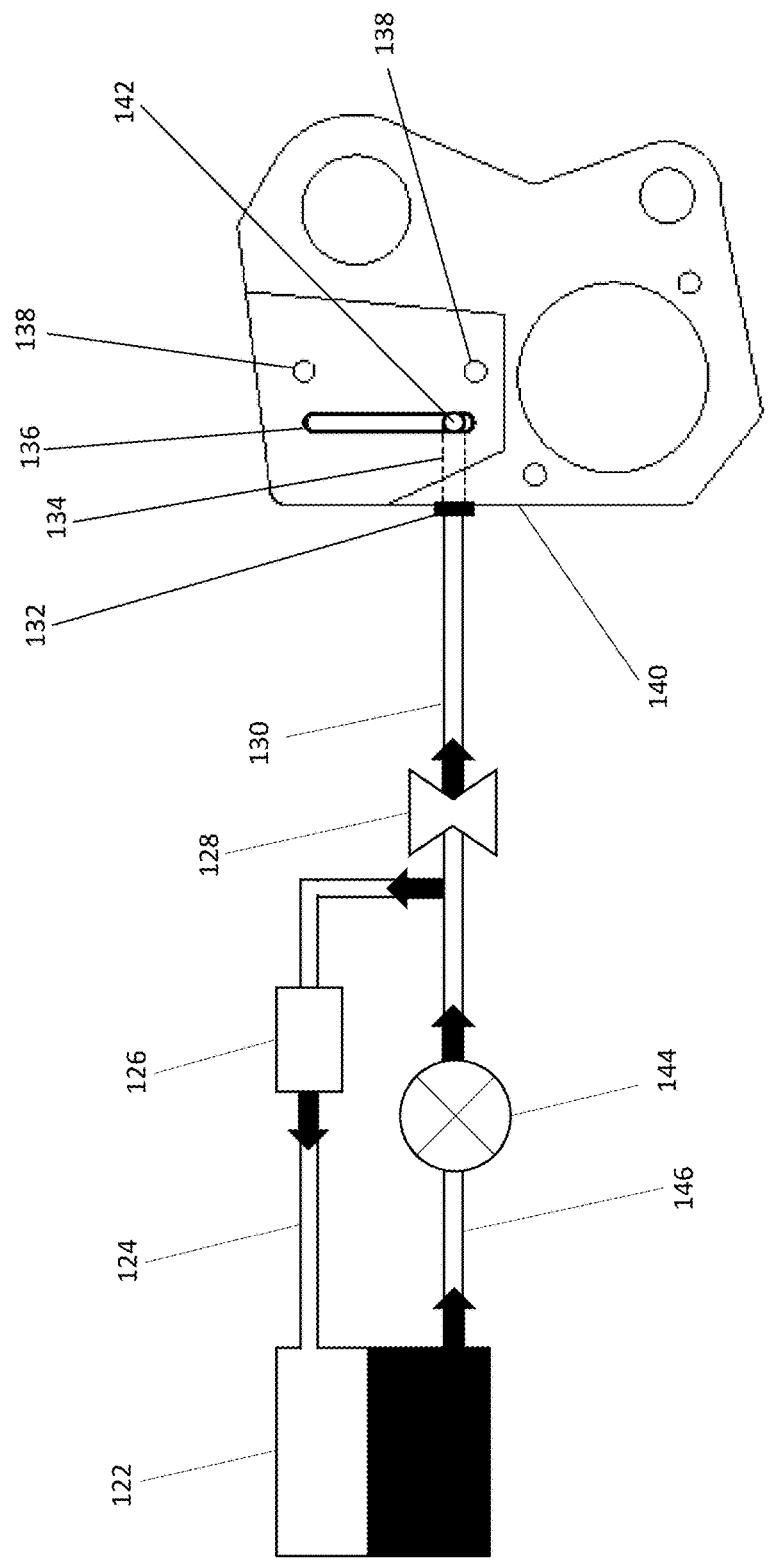
FIG. 5 depicts a schematic of the present invention, including the fluid reservoir, gerotor pump, pressure relief valve, gate valve and chainsaw guide bar mounting plate.

FIG. 3 illustrates the portion of a chainsaw guide bar 106, including the guide bar mounting slot 110 and guide bar mounting holes 112, that is typically employed in securement to and alignment with the guide bar mount plate (FIGS. 1 & 5). FIG. 3 also depicts the guide bar rails 114 and guide bar channel 116, which serve to guide the chainsaw chain blade 104 as it is driven around the guide bar 106 by the chainsaw motor drive 108 (FIGS. 1 & 2). In addition, FIG. 3 shows the guide bar oil inlet port 120, comprising a small opening located on the side of the guide bar.

Figure 4:
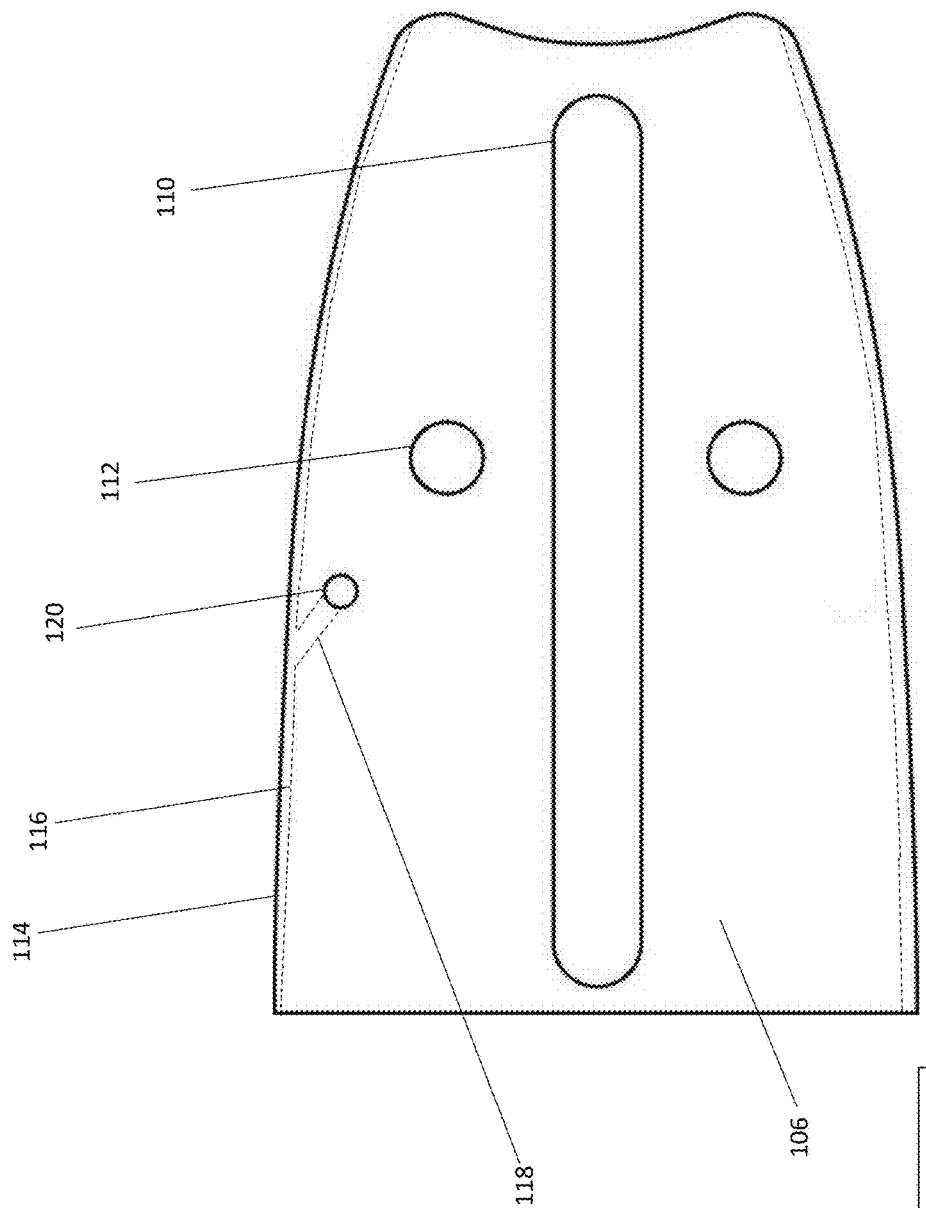
FIG. 4 depicts the attachment structures and other aspects of a chainsaw guide bar.

FIG. 4 depicts a side view of the portion of the chainsaw guide bar 106 that is typically secured to the guide bar mount plate 140 (FIGS. 1 & 5). The guide bar oil inlet port 120 is aligned with the guide bar mount plate oil feed channel 136 (FIGS. 1 & 5) using the guide bar mounting slot 110 and guide bar mounting holes 112. The guide bar oil inlet port 120 receives oil from the guide bar mount plate oil feed channel 136 (FIGS. 1 & 5) and the oil passes through the guide bar oil inlet port and into the guide bar oil conduit 118 and flows into the guide bar channel 116 where the oil provides lubrication to the interface between the chain blade 104 and the guide bar channel 116 and guide bar rails 114.

FIG. 5 depicts an embodiment of the present invention, as designed for a chainsaw or bar saw application, which comprises at least an oil reservoir 122, a gerotor pump 144, a pressure relief valve 126, a gate valve 128 and oil feed lines 124, 130 and 146. As shown in FIG. 5, the PRV 126 and GV 128 are connected downsteam from the gerotor pump. The GV is also connected to the guide bar mount plate oil feed port 132, located on the guide bar mount plate 140, via oil feed line 130. The guide bar mount plate 140 may either be contained within the chainsaw motor housing 102 (as shown in FIG. 1) or mounted independently on larger machinery.

In operation, the gerotor pump 144 pulls oil from the oil reservoir 122 through the oil feed line 146 and sends oil to the GV 128 and PRV 126. The GV 128 functions to downregulate the amount of oil that can flow from the gerotor pump 144 and into the guide bar mount plate oil feed port 132, and may enable the user to entirely shut off the flow of oil through the oil feed line 130. Downregulating the flow of oil from the GV 128 to the guide bar mount plate oil feed port 132 increases the pressure in the oil feed lines upstream of the GV.

If the pressure in the fluid feed line upstream of the GV exceeds a set threshold, the PRV 126 allows surplus oil to flow back into the oil reservoir 122 through oil feed line 124. The PRV thereby controls system pressure between the gerotor pump 144 and the GV 128 and ensures that the system will not experience a potential catastrophic build-up of pressure that could cause it to rupture or explode. The system may operate with a pressure threshold that is set between 0 and 21 PSI, but ideally the system is operated with a pressure threshold that is set between 1 and 5 PSI.

From the GV 128, oil flows through the oil feed line 130 into the guide bar mount plate oil inlet port 132, located on the guide bar mount plate 140, through the guide bar mount plate oil conduit 134, out of the guide bar mount plate oil delivery port 142 and into the oil feed channel 136. As described above with respect to chainsaw and bar saw oil lubrication systems known in the art, oil flows from the oil feed channel 136 into the guide bar oil inlet port 120, through the guide bar oil conduit 118 and into the guide bar channel 116 to provide lubrication at the guide bar channel 116 and rails 114 and the underside of the chain blade 104. The guide bar mount plate 140 attaches to the chainsaw guide bar via the guide bar mounting bolts 138 on the guide bar mount plate.

As shown in FIGS. 6-12, the gerotor pump 144 comprises inner and outer gerotor gears, with an offset number of interlocking teeth and notches, which function to open and close void spaces, or fluid cavities, as the gears turn and thereby create suction and pressure to drive fluid, e.g. oil, through the system.

Figure 6:
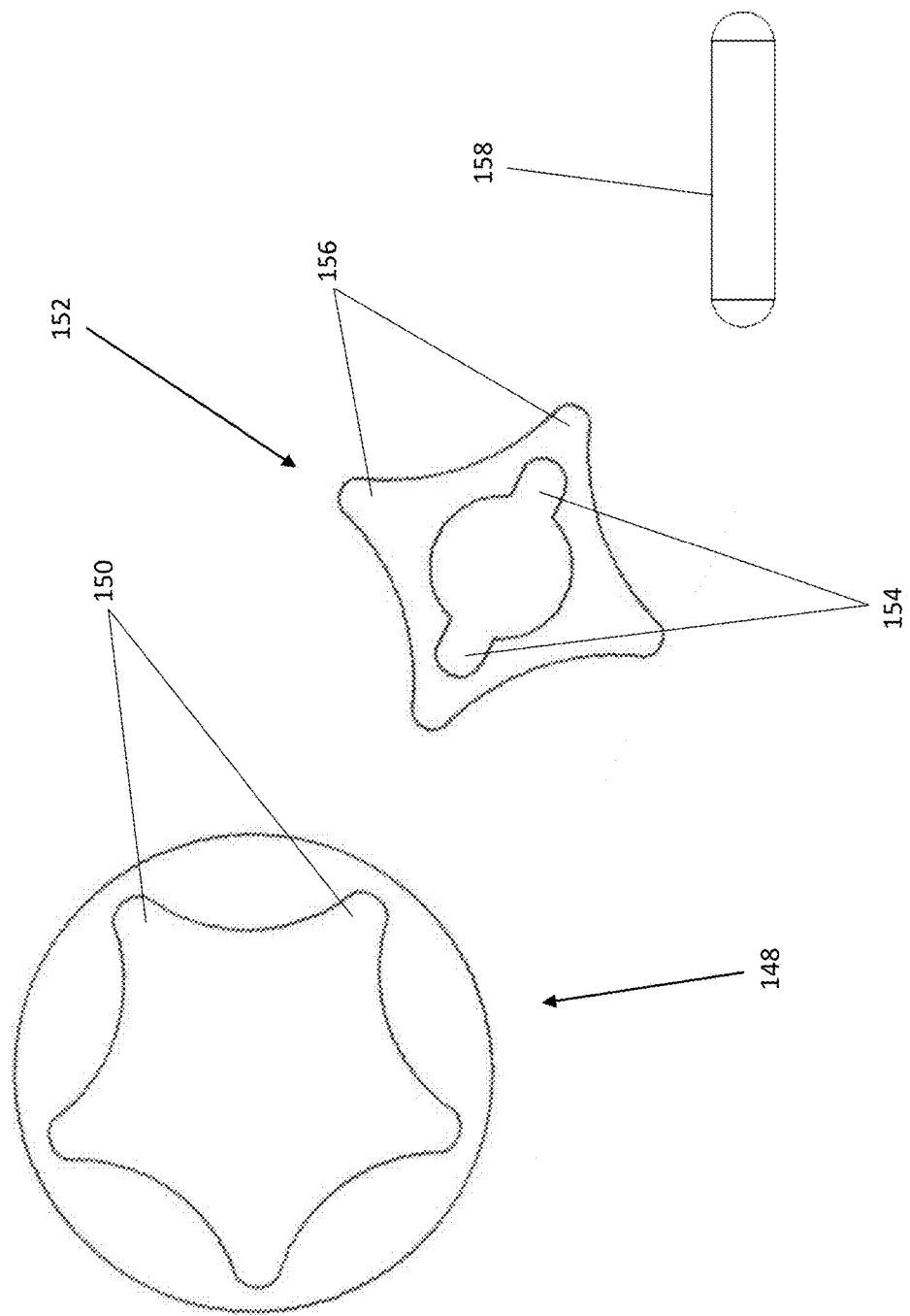
FIG. 6 depicts the outer gerotor gear, the inner gerotor gear and inner gerotor gear pin.

FIG. 6 depicts the outer gerotor gear 148, inner gerotor gear 152 and inner gerotor gear pin 158. The inner gerotor gear 152 has inner gerotor gear teeth 156 and inner gerotor gear pin notches 154, and the outer gerotor gear 148 has (n+1) number of outer gerotor gear notches 150, where "n" is the number of inner gerotor gear teeth. In one embodiment, the inner gerotor gear has four (4) gear teeth and the outer gerotor gear has five (5) gear notches.

Figure 7:
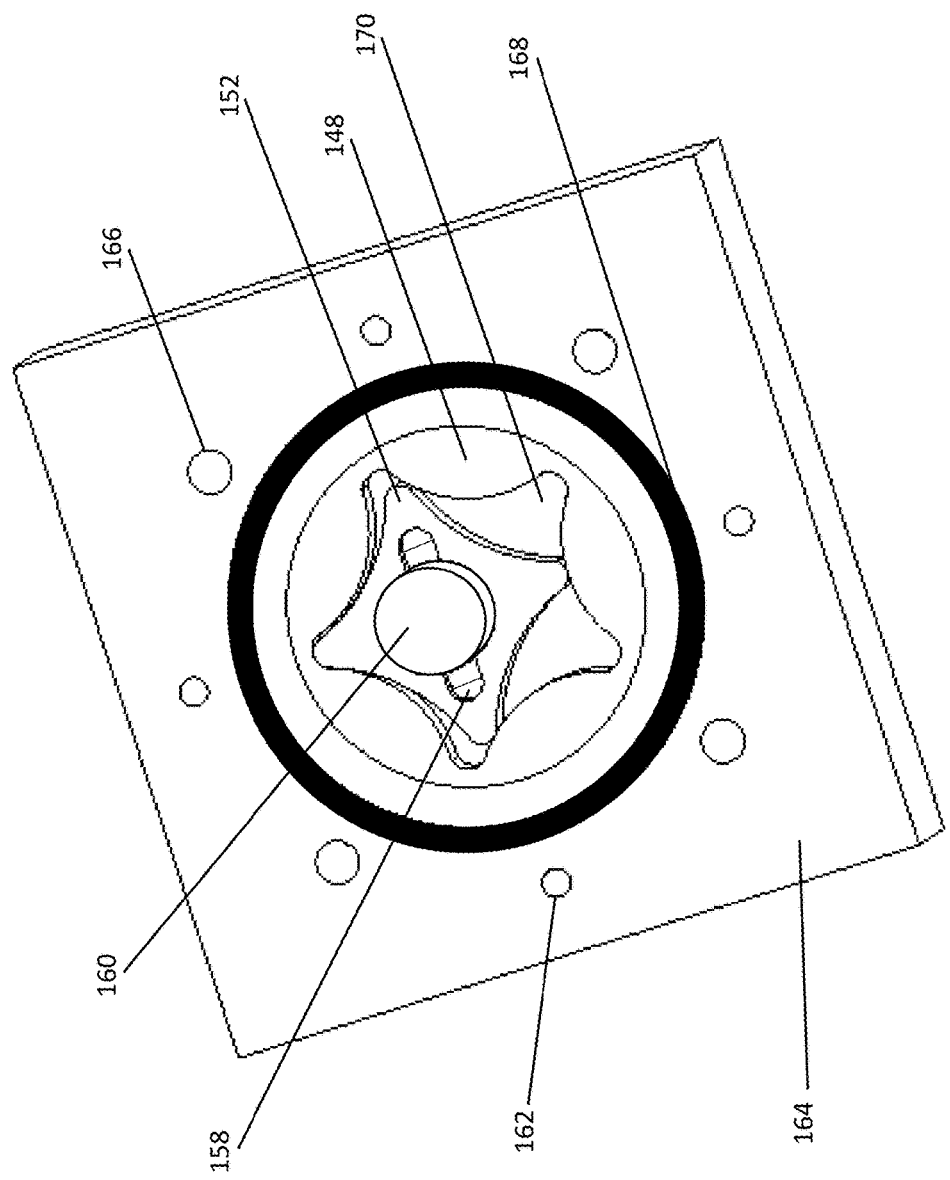
FIG. 7 depicts the internal structure of the gerotor pump, with the gerotor pump housing top portion removed.

FIG. 7 depicts the inner gerotor gear 152, outer gerotor gear 148 and inner gerotor gear pin 158 secured within the gerotor pump housing bottom portion 164. The inner gerotor gear pin 158 passes through the motor rod pin hole (192 in FIG. 13) and rests in the inner gerotor gear pin notches 154 to secure the inner gerotor gear 152 in position around the motor rod 160. The inner gerotor gear 152 is positioned within the outer gerotor gear 148, such that at any one time an inner gerotor gear tooth 156 fits precisely into an outer gerotor gear notch 150 leaving the other inner gerotor gear teeth misaligned with the other outer gerotor gear notches.

In operation, the spinning gerotor pump gears induce oil to enter a fluid cavity via suction created by opening and expanding a fluid cavity 170. The fluid is then discharged from the cavity as the cavity contracts and closes. As the motor rod 160 spins, the inner gerotor gear 152, being secured to the motor rod by the inner gerotor gear pin 158, rotates within the outer gerotor gear 148 and transfers the spinning motion to the outer gerotor gear 148.

Figure 10:
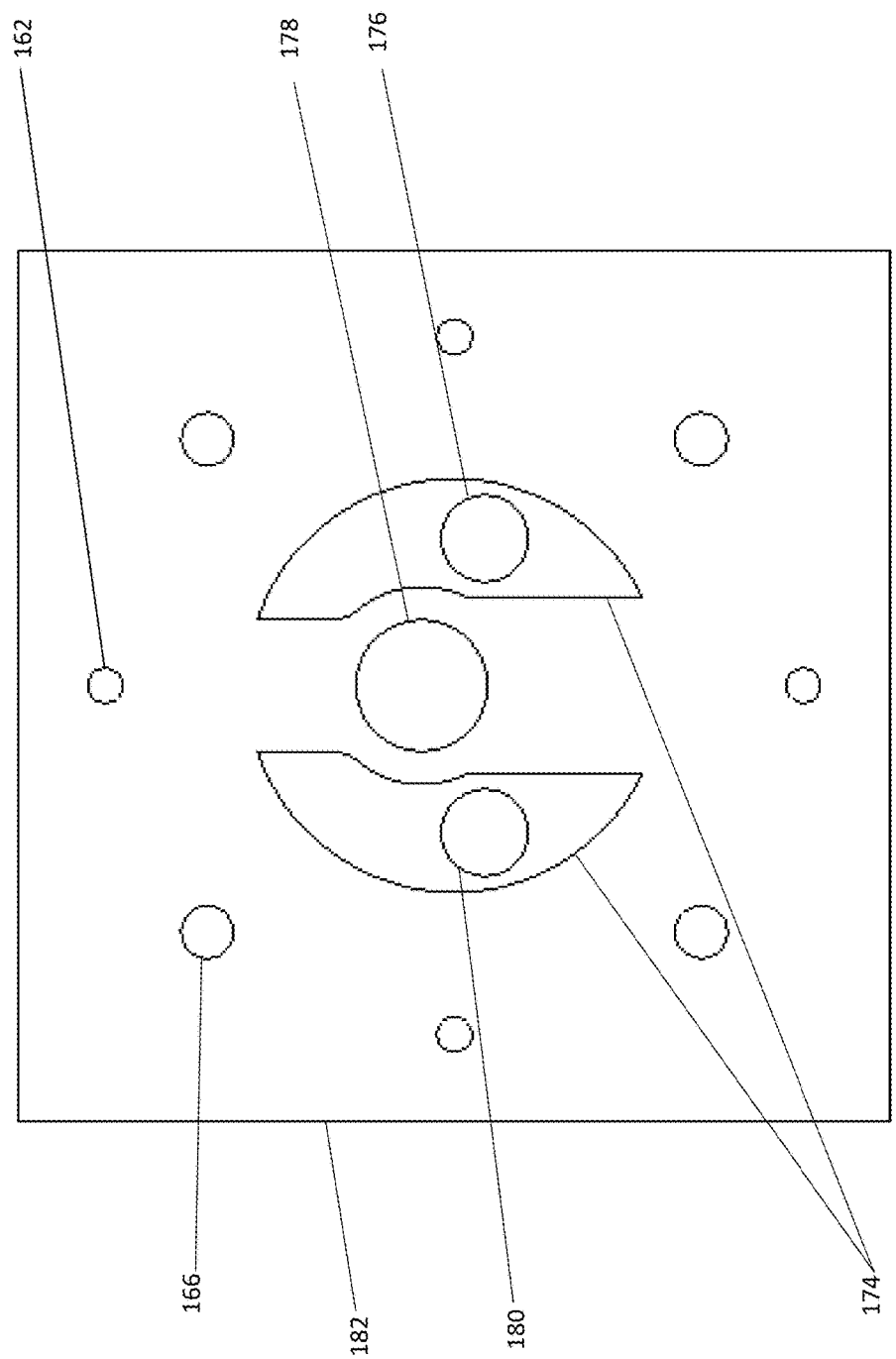
FIG. 10 depicts the gerotor pump housing top portion.
Figure 11:
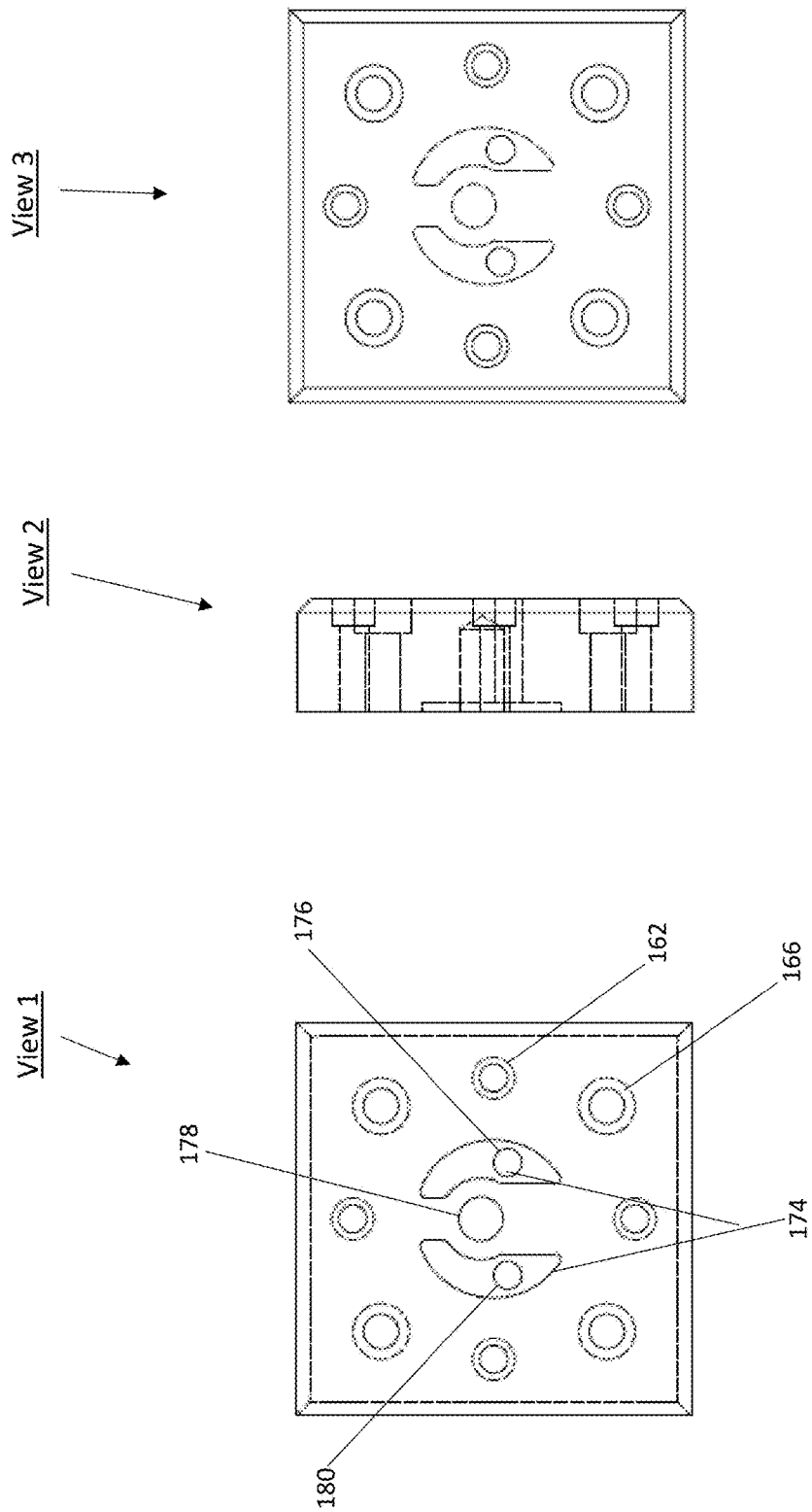
FIG. 11 is a schematic that depicts the gerotor housing top portion in three separate views: front, side and back.

As the gerotor gears spin, a fluid enclosure or cavity 170 is created, opening and expanding to pull oil from the fluid inlet port (180 in FIGS. 10 & 11). As the gears spin, a fluid cavity 170 opens, pulling in oil; as it expands to fully open, it reaches a maximum enclosure volume and oil containment capacity. Subsequently, the cavity begins to contract, and the shrinking volume forces the enclosed oil to flow out through the fluid outlet port (176 in FIGS. 10 & 11). The cavity closes entirely as an inner gerotor gear tooth 156 slides into place to occupy the outer gerotor gear notch 150 in entirety.

Figure 8:
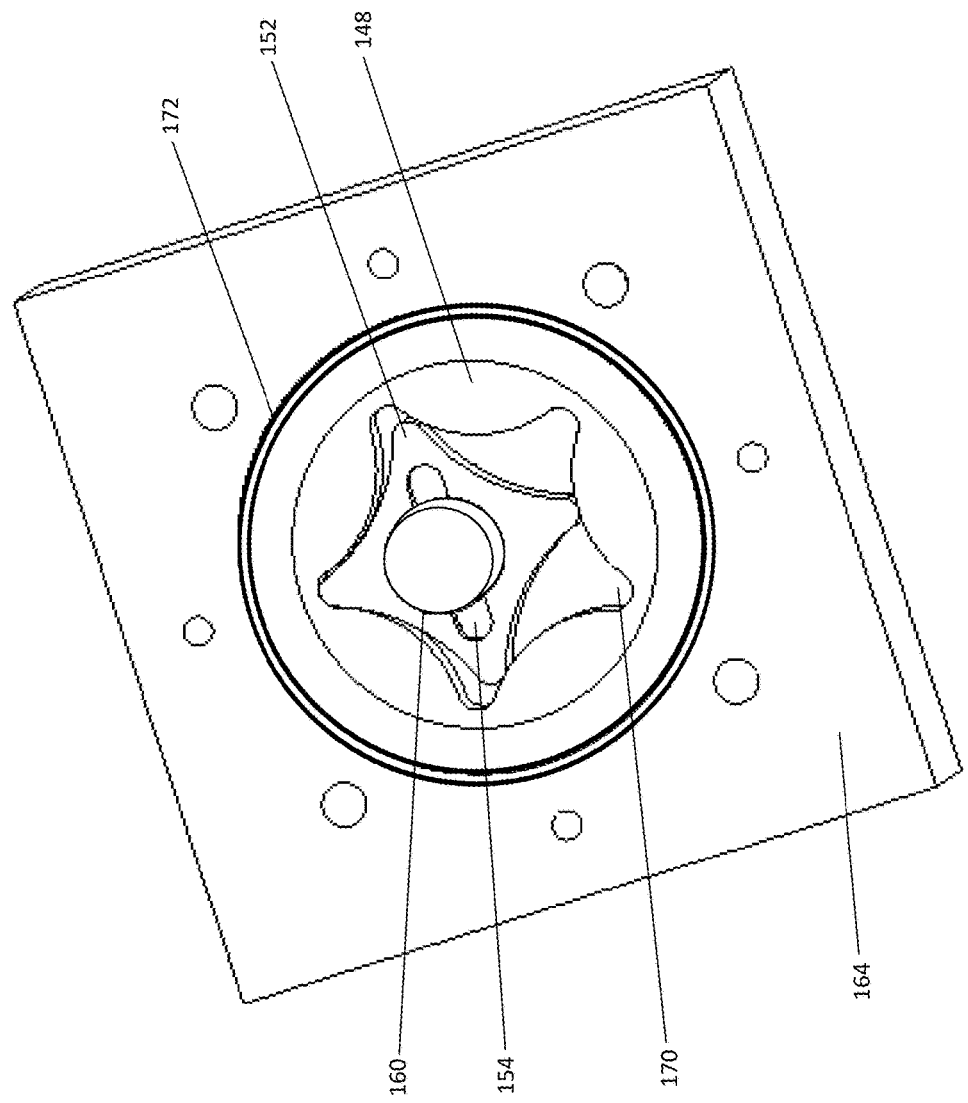
FIG. 8 depicts the internal structure of the gerotor pump, with the o-ring, inner gerotor gear pin, and gerotor pump housing top portion removed.

As seen in FIG. 7, the gerotor pump housing bottom portion 164, in conjunction with the gerotor pump housing top portion 182 (FIG. 10) holds the internal gerotor pump components in place. The gerotor pump housing bottom portion 164 attaches to the gerotor pump housing top portion 182 via large bolt holes 166 and small bolt holes 162. The gerotor o-ring 168 creates a sealed fluid chamber around the outer gerotor gear 148, inner gerotor gear 152, inner gerotor gear pin 158 and motor rod 160 required to maintain suction during the creation of a fluid enclosure 170 and ensure that oil does not leak out of the gerotor pump. FIG. 8 shows the gerotor o-ring groove 172, which holds the gerotor o-ring 168 that creates a fluid-tight seal around the gerotor gears.

Figure 9:
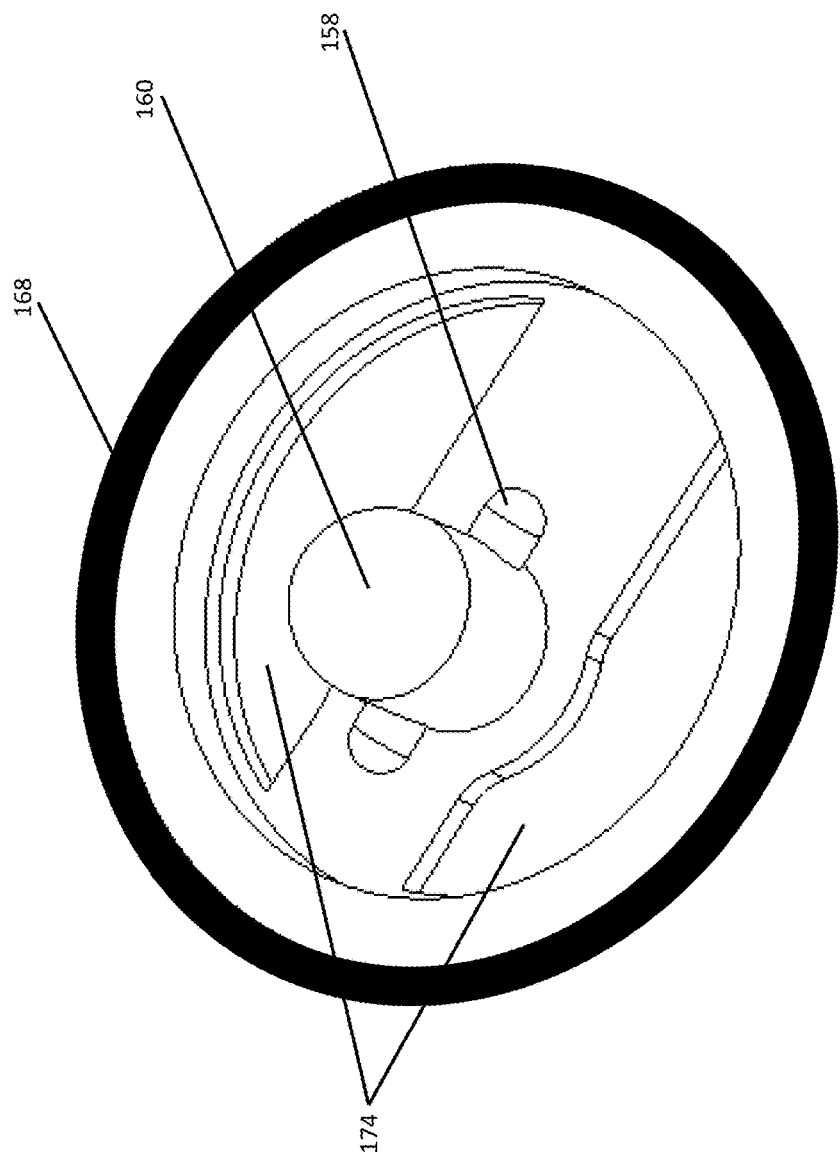
FIG. 9 depicts the gerotor pump bottom portion with most of the gerotor gear components removed.

FIG. 9 depicts the gerotor pump 144 with the gerotor pump housing top portion (182 in FIG. 10), inner gerotor gear 152 and outer gerotor gear 148 removed. Oil pocket recesses 174 present in the gerotor pump bottom housing portion 164 are visible, which recesses serve to increase the amount of oil that can be taken into and held within a fluid enclosure 170. The oil pocket recesses 174 also function to bring oil to the underside of the gerotor gears for lubrication.

FIG. 10 shows gerotor pump housing top portion 182. Two oil pocket recesses 174 serve to bring oil to the topside of the gerotor gears for lubrication, and also expand total fluid enclosure 170 size. Oil enters the gerotor pump through the oil inlet port 180, fills the fluid cavity 170 created by the gap between an inner gerotor gear tooth 156 and outer gerotor gear notch 150, and is discharged from the gerotor pump through the oil outlet port 176, as the fluid cavity 170 closes.

The motor rod hole 178 provides space for the top end of the motor rod 160 to be enclosed entirely within the gerotor pump housing. To secure the two halves of the gerotor pump housing together bolts may be threaded into one or more large bolt holes 166 and small bolt holes 162, which align between the top and bottom gerotor pump housing portions (164 and 182, respectively).

FIG. 11 is a schematic of the gerotor pump housing top portion 172 where View 1 is of the inner face of the top portion, View 2 is a side view of the housing top portion and View 3 is of the outer face of the top portion. In View 1, the oil pocket recesses 174 used to increase fluid enclosure 170 size are visible.

Figure 12:
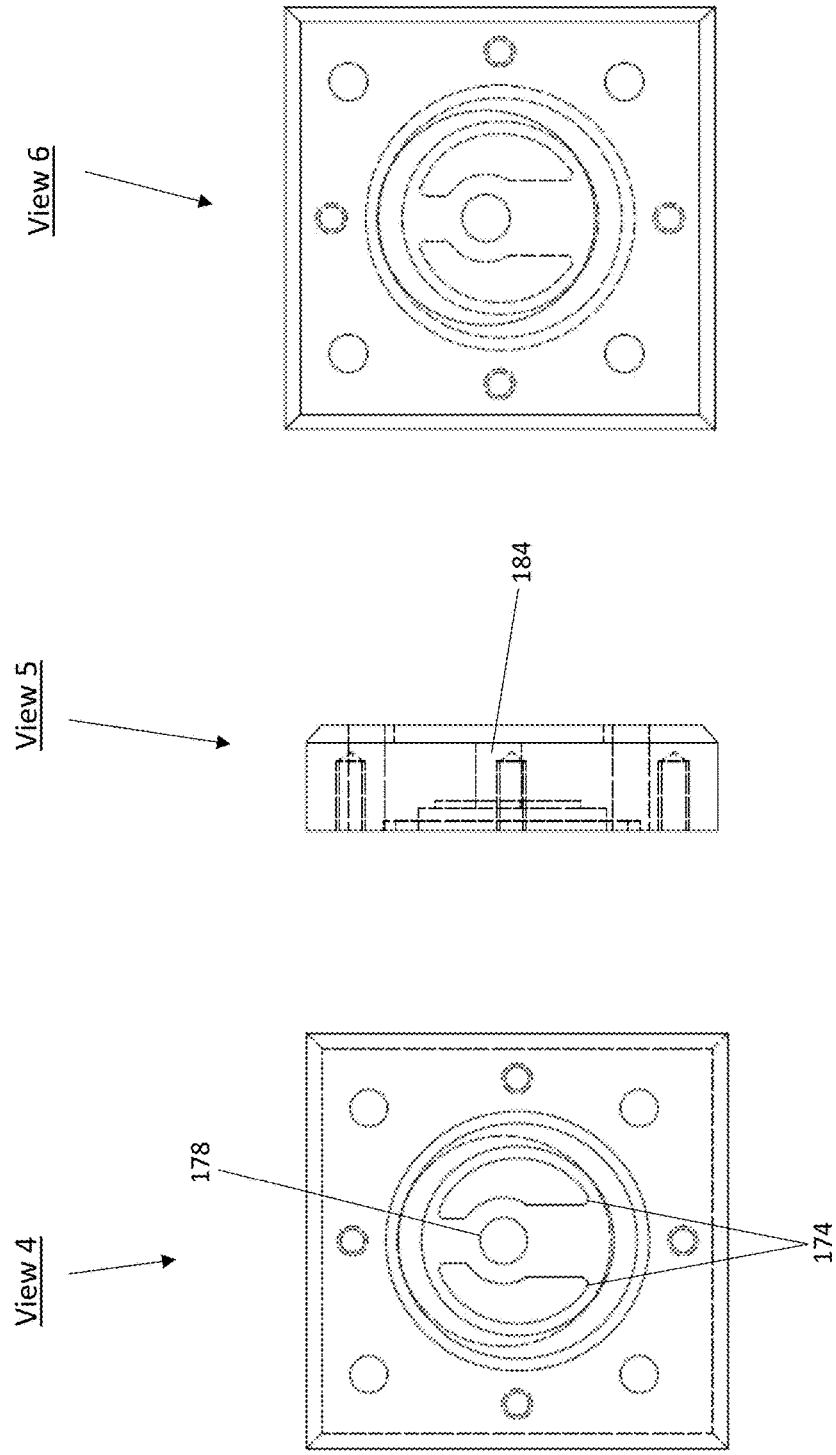
FIG. 12 is a schematic that depicts the gerotor housing bottom portion in three separate views: front, side and back.
Figure 13:
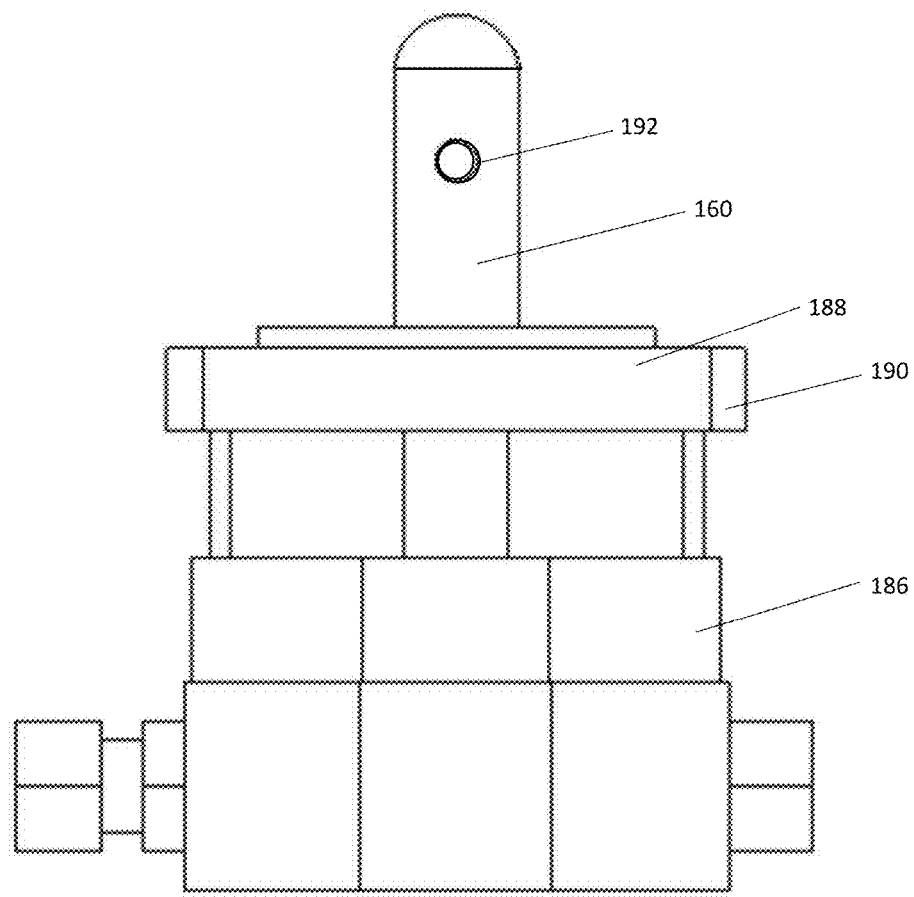
FIG. 13 depicts a side view of the pump motor and the motor mounting plate.
Figure 14:
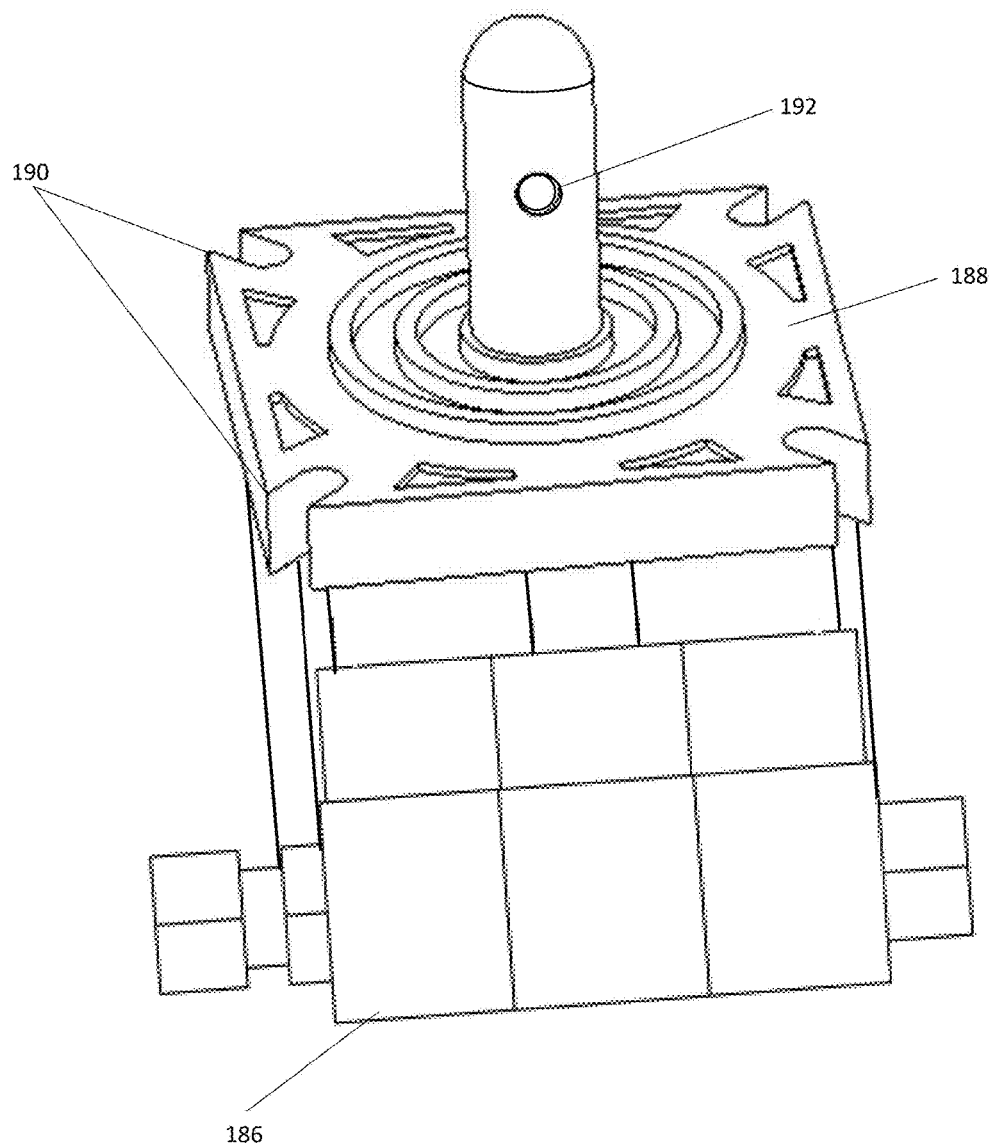
FIG. 14 depicts a perspective top-side view of the pump motor and the motor mounting plate.

FIG. 12 is a schematic of the gerotor pump housing bottom portion 164 where View 4 is of the inner face of the bottom portion, View 5 is a side view of the housing bottom portion and View 6 is the outer face of the bottom portion— which connects to the motor mounting plate (188 in FIGS. 13 & 14). View 4 reflects two oil pocket recesses 174 that expand fluid cavity size and provide lubrication to the underside of the inner and outer gerotor gears, 152 and 148 respectively. As visible in View 5, the motor rod pass-through 184 allows the motor rod 160 to pass from the motor (186 in FIG. 13) through the gerotor pump housing bottom portion 164, through the gerotor gears and into the motor rod hole 178.

FIGS. 13 and 14 depict a motor 186 that may be used to drive the inner gerotor gear 152 which in turn spins the outer gerotor gear 148 and creates the fluid enclosures 170 necessary to move oil between the fluid inlet port 180 and fluid outlet port 176. The inner gerotor gear pin 158 rests in the motor rod pin hole 192 and occupies the inner gerotor gear pin notches 154 to rotationally secure the inner gerotor gear 152 to the motor rod 160. The gerotor housing may be mounted onto the motor mounting plate 188 by securing bolts threaded into the large bolt holes 166 to the motor mounting plate pump fixture points 190.

The pump motor may be powered by, but is not limited to, combustion, electric or hydraulic mechanisms. In a preferred embodiment the powered motor is hydraulic. The powered motor may also be in communication with the combustion, electric or hydraulic drive system of the machine, e.g. chainsaw or firewood processor, such that the pump motor is activated simultaneously when the device is in use.

The embodiments of the present invention may be implemented on devices including, but not limited to, chainsaws, felling grapple hooks, firewood processors, and/or tree harvesters. It should be understood that claimed subject matter is not limited to use only within the forestry industry, but may also be used in other industries such as, but not limited to, the mining industry.

While the embodiment just described includes the placement of a GV and PRV after a gerotor pump, it should be understood that claimed subject matter is not intended to be limited in scope to any particular arrangement or combination of valves, and valves may be placed before or after the gerotor pump in any particular order as desired by the user. Further, it should be understood that claimed subject matter need not include any valves, or only two valves, but may include any number of valves in combination with a gerotor pump and oil reservoir to provide lubrication to a chainsaw chain blade, such as seen in FIG. 15.

Figure 15:
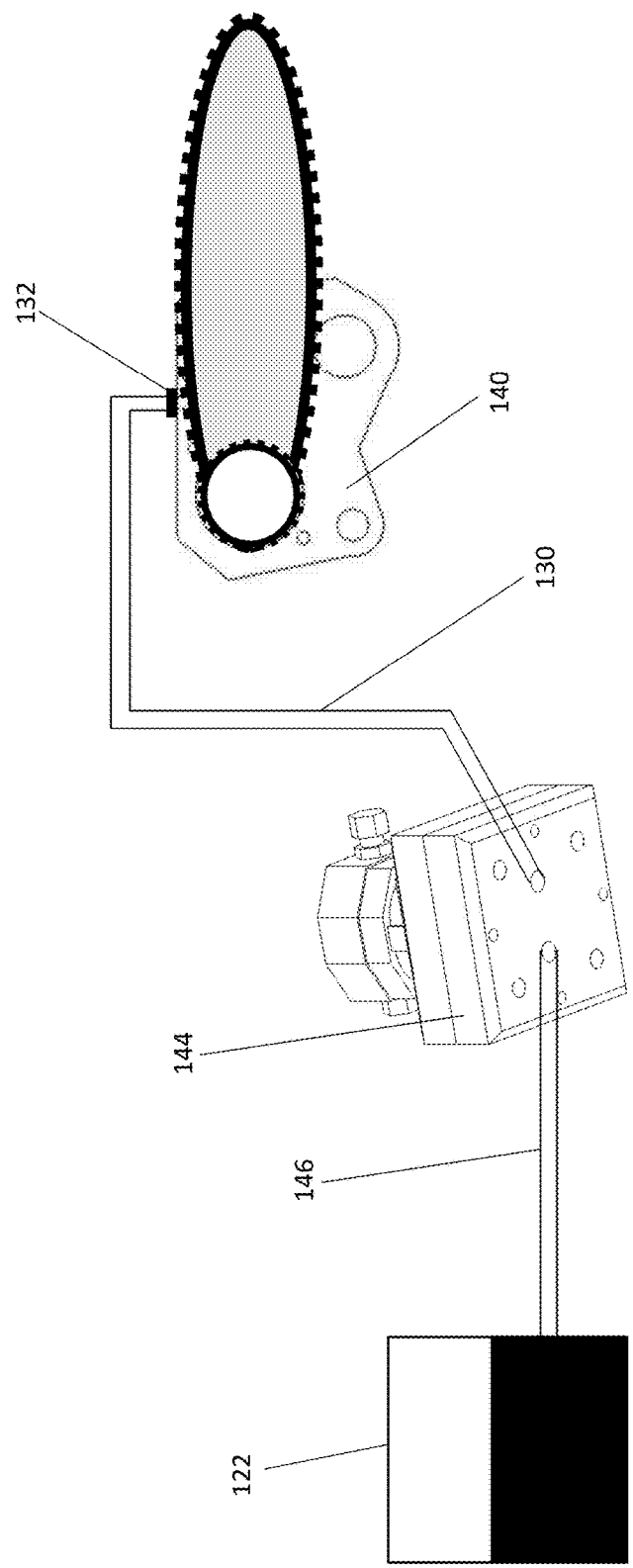
FIG. 15 depicts an exemplary configuration of the present invention.

FIG. 15 depicts a sample configuration of the present invention without a PRV or GV in place, wherein the gerotor pump 144 is in fluid communication with the oil reservoir 122 via an oil feed line 146 and with the guide bar mount plate oil inlet port 132 via an oil feed line 130.

While the embodiment just described includes the use of large and small bolts to secure the gerotor pump 144 housing portions (164 and 182) together and to the motor mounting plate 188 of the motor 186, it should be understood that claimed subject matter is not intended to be limited in scope to the use of bolts to secure the housing portions to each other or to a motor mounting plate, and bolts not need be used as the specific mechanisms of securement, attachment or affixation.

Further, it should be understood that claimed subject matter can involve any configuration of bolts of any size, and need not be specifically oriented as depicted in FIGS. 11 and 12. Additionally, it should be understood that claimed subject matter is not intended to be limited to a pump housing composed of two independent halves secured together. But instead, the invention may rather include, but not is limited to, a single housing portion created as a single independent unit or a single housing portion comprising a gerotor pump housing top portion and bottom portion having been welded together.

It should be understood that claimed subject matter is not intended to be limited in scope wherein the inner gerotor gear 152 and outer gerotor gear 148 rotate clockwise, but that inner gerotor gear and outer gerotor gear may instead rotate counterclockwise, as desired by the user.

While the embodiment just described includes the use of two large oil recess pockets 174 in the gerotor pump housing bottom portion 164 parallel to two smaller oil recess pockets 174 in the gerotor pump housing top portion 182, it should be understood that claimed subject matter need not include oil recess pockets sized and oriented in this manner, but may have any number of oil recess pockets, i.e. one large pocket or three or more small pockets, oriented at any angle with respect to any other oil recess pockets inside of the gerotor pump housing.

While the figures just described depict an inner gerotor gear 152 with four inner gerotor gear teeth 156 and an outer gerotor gear 148 with five outer gerotor gear notches 154, it should be understood that claimed subject matter is not limited to this specific number of teeth and notches, but may include an inner gerotor gear with any number of inner gerotor gear teeth and outer gerotor gear with any number of outer gerotor gear notches, such that the number of outer gerotor gear notches exceeds the number of inner gerotor gear teeth by at least one notch.

While the embodiments just described entail the use of oil as a lubricant for chainsaw chain blades, it should be understood that claimed subject matter is not intended to be limited in scope to only the use of oil as a lubricant, but that the lubrication system may be used to deliver any type of lubricating fluid, including but not limited to vegetable oil, motor oil, gasoline, or water.

It should be understood that, although a specific embodiment has just been described, claimed subject matter is not intended to be limited in scope to any particular embodiment or implementation. In the preceding description, various aspects of claimed subject matter may have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may not occur to those skilled in the art. It is, therefore, to be understood that the appended claims are intended to cover all such modifications or changes as fall within the true spirit of the claimed subject matter.

What is claimed is:

1. A chainsaw having a fluid lubrication system, configured to lubricate an interface between a chain blade and a bar channel of a guide bar, comprising:

the guide bar, comprising an elongated member with the bar channel located around a perimeter of the elongated member, wherein the chain blade is configured to interface with and ride along the bar channel of the guide bar, and wherein the bar channel is configured to guide the chain blade to rotate around the guide bar to saw through a material;

a motor having a motor drive shaft that extends from the motor to spin a chain blade gear configured to drive the chain blade along the bar channel of the guide bar;

a fluid reservoir;

a fluid lubricant contained in the fluid reservoir;

a gerotor pump, comprising:

a pump housing, having a fluid inlet port and a fluid outlet port, wherein the fluid inlet port and the fluid outlet port are each connected to a system of fluid feed lines, and wherein the motor drive shaft extends from the motor further into the pump housing;

an inner gerotor gear, having a number of gear teeth, wherein the inner gerotor gear is secured to the motor drive shaft, such that it will spin with the motor drive shaft;

an outer gerotor gear, having a number of gear notches equal to the number of gear teeth plus an additional notch, such that for n gear teeth there are a total of n+1 gear notches, wherein the inner gerotor gear is positioned within the outer gerotor gear such that it transfers the spinning rotation of the motor drive shaft to the outer gerotor gear;

one or more fluid pocket recesses formed by the pump housing and configured to create one or more dynamic fluid enclosures by spinning of the inner and outer gerotor gears, wherein the dynamic fluid enclosures are configured to receive the fluid lubricant as it travels from the fluid inlet port to the fluid outlet port, wherein the fluid lubricant provides lubrication between the inner and outer gerotor gears and the pump housing;

a fluid-tight seal positioned around the inner and outer gerotor gears inside the pump housing; and the system of fluid feed lines, wherein the system of fluid feed lines establishes fluid communication between the fluid reservoir, the gerotor pump and a point of application within the bar channel, and wherein the gerotor pump is configured to pump the fluid lubricant from the fluid reservoir, through the system of fluid feed lines and to the point of application.

2. The chainsaw having a fluid lubrication system described in claim 1 including a gate valve located between, connected to and in fluid communication with the gerotor pump—and the point of application via the system of fluid feed lines, wherein the gate valve downregulates the flow of the fluid lubricant from the gerotor pump to the point of application, resulting in an increasing pressure within one or more feed lines within the system of fluid feed lines between the gerotor pump and the gate valve, and also including a pressure relief valve located between, connected to and in fluid communication with the fluid reservoir and the system of fluid feed line between the gerotor pump and the gate valve, wherein the pressure relief valve returns excess fluid lubricant to the fluid reservoir and maintains the pressure within the system of fluid feed line between the gerotor pump and the gate valve at or below a set threshold.

3. The chainsaw having a fluid lubrication system of claim 1, wherein the inner gerotor gear further has inner gerotor gear pin notches and is secured to the motor drive shaft by an inner gerotor gear pin placed within a pin hole located in the motor drive shaft.

4. The chainsaw having a fluid lubrication system of claim 1, wherein the point of application is a point between the guide bar and the chain blade.

5. A chainsaw fluid lubrication system configured to lubricate an interface between a chain blade and a guide bar, comprising:

an elongated bar member comprising the guide bar, wherein the guide bar is configured to guide the chain blade to rotate around the guide bar to saw through a material, wherein the chain blade is configured to interface with and ride along an edge of the guide bar;

a chainsaw motor drive configured to drive the chain blade along the edge of the guide bar;

a fluid reservoir;

a gerotor pump, comprising:

a pump housing, having a fluid inlet port and a fluid outlet port, wherein the fluid inlet port and the fluid outlet port are each connected to a system of fluid feed lines, and wherein the motor drive shaft extends from the motor further into the pump housing;

a gerotor pump motor, having a motor drive shaft that extends from the motor into the pump housing;

an inner gerotor gear, having a number of gear teeth, wherein the inner gerotor gear is secured to the motor drive shaft, such that it will spin with the motor drive shaft;

an outer gerotor gear, having a number of gear notches equal to the number of gear teeth plus an additional notch, such that for n gear teeth there are a total of n+1 gear notches, wherein the inner gerotor gear is positioned within the outer gerotor gear such that it transfers the spinning rotation of the motor drive shaft to the outer gerotor gear;

one or more fluid pocket recesses formed by the pump housing and configured to create one or more dynamic fluid enclosures by spinning of the inner and outer gerotor gears, wherein the dynamic fluid enclosures are configured to receive a fluid as it travels from the fluid inlet port to the fluid outlet port, wherein the fluid provides lubrication between the inner and outer gerotor gears and the pump housing;

a fluid-tight seal positioned around the inner and outer gerotor gears inside the pump housing; and the system of fluid feed lines, wherein the system of fluid feed lines establishes fluid communication between the fluid reservoir, the gerotor pump and a point of application at the interface between the guide bar and the chain blade, and wherein the gerotor pump is configured to pump a fluid from the fluid reservoir, through the system of fluid feed lines and to the point of application.

6. The chainsaw fluid lubrication system of claim 5, including one or more pressure relief valves, wherein the pressure relief valves are in fluid communication with the gerotor pump and one or more gate valves, and wherein the one or more pressure relief valves are configured to return surplus fluid back to the fluid reservoir if the fluid pressure in the system of fluid feed lines exceeds a set threshold.

7. The chainsaw fluid lubrication system of claim 6, wherein the pressure threshold is set between 0 and 21 PSI.

8. The chainsaw fluid lubrication system of claim 7, wherein the pressure threshold is set between 1 and 5 PSI.

9. The chainsaw fluid lubrication system of claim 5, including one or more gate valves, wherein the gate valves are in fluid communication with the gerotor pump and one or more pressure relief valves, wherein the gate valves are configured to regulate the rate and amount of fluid flowing through the system of fluid feed lines.

10. The chainsaw fluid lubrication system of claim 5 wherein the fluid is oil having a viscosity equivalent to SAE 10 to SAE 50.

11. The chainsaw fluid lubrication system of claim 10 wherein the fluid is oil having a viscosity equivalent to SAE 20 to SAE 30.

12. The chainsaw fluid lubrication system of claim 5, wherein the inner gerotor gear further has inner gerotor gear pin notches and is secured to the motor drive shaft using an inner gerotor gear pin placed within a pin hole located in the motor drive shaft.

13. The chainsaw fluid lubrication system of claim 5, wherein the chainsaw guide bar further comprises:
- a bar channel formed at an edge of the elongated bar member by two or more bar channel rails, wherein the bar channel and the bar channel rails are configured to guide the chain blade as it rides along the edge of the elongated bar member;
- a fluid inlet port located on a surface of the elongated bar member, configured to allow fluid to flow from the system of fluid feed lines into a fluid conduit, wherein the fluid conduit is configured to allow fluid to flow from the system of fluid feed lines, through the fluid inlet port and fluid conduit and into the formed by the guide bar rails.

14. The chainsaw fluid lubrication system of claim 13, including a gate valve located between, connected to and in fluid communication with the gerotor pump and the point of application via the system of fluid feed lines, wherein the gate valve downregulates the flow of the fluid lubricant from the gerotor pump to the point of application, resulting in an increasing pressure within one or more feed lines within the system of fluid feed lines between the gerotor pump and the gate valve, and also including a pressure relief valve located between, connected to and in fluid communication with the fluid reservoir and the system of fluid feed line between the gerotor pump and the gate valve, wherein the pressure relief valve returns excess fluid lubricant to the fluid reservoir and maintains the pressure within the system of fluid feed line between the gerotor pump and the gate valve at or below a set threshold.

* * * * *